(12) United States Patent
Sakai et al.

(10) Patent No.: US 7,212,272 B2
(45) Date of Patent: May 1, 2007

(54) ELECTRICAL WIRING STRUCTURE, ELECTRO-OPTICAL DEVICE, AND ELECTRONIC APPARATUS

(75) Inventors: Kazuyoshi Sakai, Nagano-ken (JP); Tadashi Watanabe, Shiojiri (JP)

(73) Assignee: Seiko Epson Corporation (JP)

( * ) Notice: Subject to any disclaimer, the term of this patent is extended or adjusted under 35 U.S.C. 154(b) by 183 days.

(21) Appl. No.: 10/782,402

(22) Filed: Feb. 19, 2004

(65) Prior Publication Data

US 2004/0207795 A1    Oct. 21, 2004

(30) Foreign Application Priority Data

Feb. 20, 2003    (JP)    .............................. 2003-043145

(51) Int. Cl.
*G02F 1/1345*    (2006.01)

(52) U.S. Cl. ........................................ 349/149; 349/152

(58) Field of Classification Search ......... 349/149–152
See application file for complete search history.

(56) References Cited

U.S. PATENT DOCUMENTS

| 5,828,433 | A | * | 10/1998 | Shin ........................... 349/147 |
| 6,608,663 | B2 | * | 8/2003 | Sakamoto et al. .......... 349/149 |
| 6,882,390 | B2 | * | 4/2005 | Hinata et al. ............... 349/114 |
| 6,912,036 | B2 | * | 6/2005 | Komeno et al. ............ 349/149 |

FOREIGN PATENT DOCUMENTS

| JP | 62-161226 | 10/1987 |
| JP | 04-303824 | 10/1992 |
| JP | 04-343302 | 11/1992 |
| JP | 05-259408 | 10/1993 |
| JP | 06-242453 | 9/1994 |
| JP | 09-062203 | 3/1997 |
| JP | 09-171717 | 6/1997 |
| JP | 10-242477 | 9/1998 |
| JP | 11-052366 | 2/1999 |
| JP | 11-119664 | 4/1999 |
| JP | 2001-033778 | 2/2001 |
| JP | 2001-075118 | 3/2001 |
| JP | 2002-014334 | 1/2002 |
| JP | 2002-049032 | 2/2002 |
| JP | 2002-049033 | 2/2002 |
| JP | 2002-049034 | 2/2002 |
| JP | 2002-049035 | 2/2002 |
| JP | 2002-229474 | 8/2002 |

* cited by examiner

*Primary Examiner*—Dung T. Nguyen
(74) *Attorney, Agent, or Firm*—Harness, Dickey & Pierce, P.L.C.

(57) ABSTRACT

An electro-optical device and an electronic apparatus are provided with reduced wiring resistance. A second wiring pattern for connecting an upper wiring connected to a mounting terminal to a first inter-substrate conducting terminal includes a base electrode. An inorganic insulating film is not attached to the sides of the base electrode. As a result, the upper wiring on each side of the base electrode and the first inter-substrate conducting terminal are electrically connected to the base electrode through the sides. The path from the mounting terminal to the first inter-substrate conducting terminal is formed in the order of upper wiring, one side of the base electrode, base electrode, the other side of the base electrode, and then the first inter-substrate conducting terminal. The second wiring pattern uses the base electrode formed of a metal film to sharply reduce wiring resistance.

24 Claims, 11 Drawing Sheets

F I G. 1
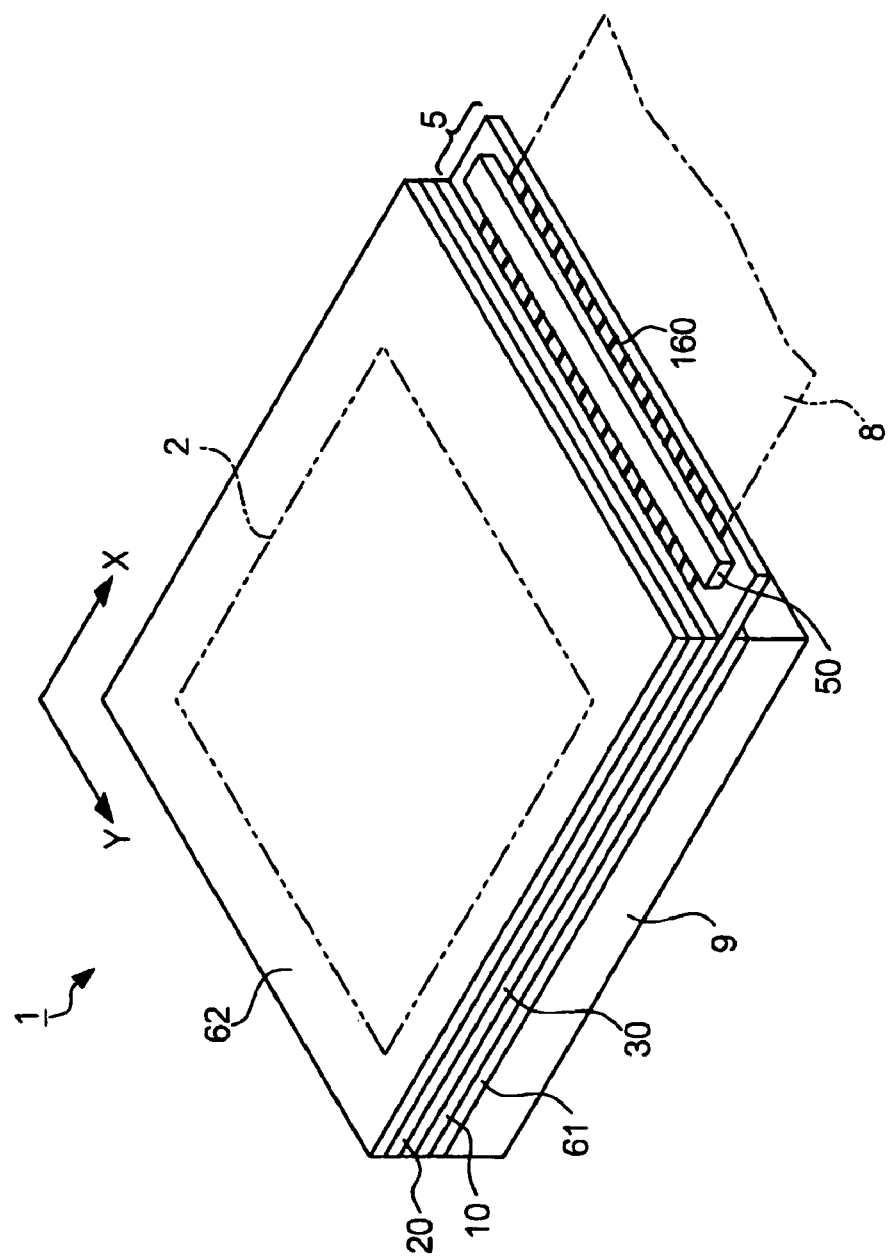

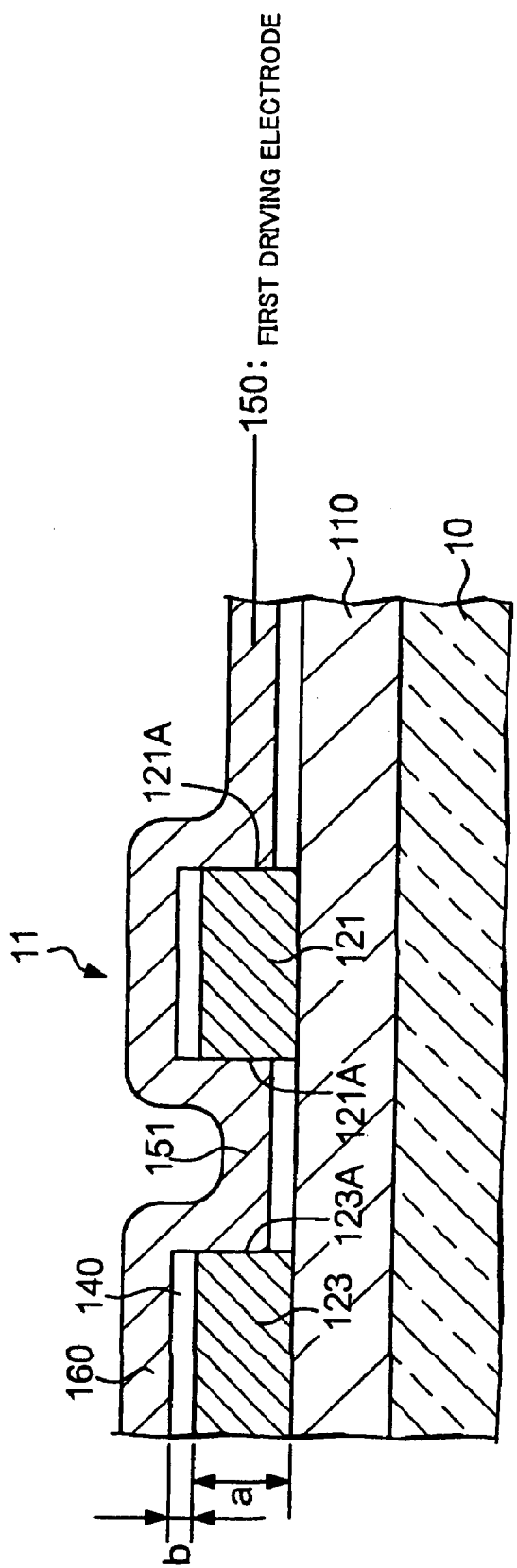

ELECTRICAL WIRING STRUCTURE, ELECTRO-OPTICAL DEVICE, AND ELECTRONIC APPARATUS

BACKGROUND OF THE INVENTION

1. Technical Field of the Invention

The present invention relates to an electrical wiring structure, an electro-optical device, and an electronic apparatus, which are particularly appropriate for use in an electro-optical device, such as a liquid crystal display device, for example.

2. Description of the Related Art

Hitherto, an electro-optical device such as a liquid crystal display device, in which an electro-optical material such as liquid crystal is interposed between a pair of opposed substrates, has been well known.

The structure of the liquid crystal display device will be more specifically described below. The liquid crystal display device includes a first substrate constituting a base, a second substrate arranged to be opposite to the first substrate and to be an observation side, and a sealing material having a rectangular shape by which a gap is formed between the first substrate and the second substrate and then a liquid crystal layer is formed in the gap. In addition, first transparent driving electrodes are formed on the first substrate, second transparent driving electrodes extending in a direction substantially perpendicular to the first driving electrodes are formed on the second substrate, and the electrodes at the intersections of the first and second driving electrodes intersects and liquid crystal interposed therebetween constitute pixels. When a signal is supplied to each of the driving electrodes, a twist corresponding to the signal occurs in the liquid crystal disposed at each pixel. In this case, optical modulation is performed on light passing through the liquid crystal between the driving electrodes by the twist occurring in the liquid crystal.

Liquid crystal display devices include a transmissive liquid crystal display device which arranges a backlight device at the rear side of a first substrate and a reflective liquid crystal display device in which a light reflecting film is formed at a lower layer side of the first driving electrodes.

The transmissive liquid crystal display device displays a predetermined image by performing optical modulation on light emitted from the backlight device while it passes an electro-optical material layer. The reflective liquid crystal display device displays a predetermined image by reflecting external light incident from a second substrate side by a light reflecting film and performing optical modulation while the external light is emitted again from the second substrate.

Further, liquid crystal display devices include a transflective liquid crystal display device. The transflective liquid crystal display device arranges a backlight device at the rear side of the first substrate and forms a light reflecting film having light transmissive holes at a lower layer side of a first driving electrode. The transflective liquid crystal display device transmits light emitted from the backlight device through the light transmission holes to display an image (hereinafter, referred to as a transmissive mode). In addition, the transflective liquid crystal display device reflects incident external light by a light reflecting film in a region in which no light transmission hole is formed to display an image (hereinafter, referred to as a reflective mode).

In order to display an image on the liquid crystal display device, a driver IC for supplying a predetermined signal to both the first driving electrodes and the second electrodes needs to be provided. A method for installing the driver IC in the liquid crystal display device includes a method for installing the driver IC on both the first substrate and the second substrate, respectively and a method for installing the driver IC on one of the first and second substrates.

Therefore, in order to minimize the size of the liquid crystal display device and form a large image display region, a method for forming a protruding region protruding from the second substrate relative to the first substrate and installing the driver IC on the protruding region has been used.

A mounting terminal, on which the driver IC is directly mounted in the protruding region or a flexible substrate to which the driver IC is connected is mounted, is formed in the protruding region. In order to connect the first driving electrodes and the second driving electrodes to the mounting terminal, a first inter-substrate conducting terminal, a first wiring pattern, and a second wiring pattern, which will be described later, are formed on the first substrate, and a second inter-substrate conducting terminal, which will be described later, is formed on the second substrate.

Here, the first wiring pattern is a wiring line for electrically connecting the mounting terminal to the first driving electrodes. The first inter-substrate conducting terminal is formed in a region overlapping the second substrate, and the second wiring pattern is a wiring line for connecting the mounting terminal to the first inter-substrate conducting terminal. The second inter-substrate conducting terminal on the second substrate is formed in a position opposite to the first inter-substrate conducting terminal.

In addition, the first substrate and the second substrate are bonded to each other at a predetermined gap by a sealing material containing conductive particles. The conductive particles electrically connect the first inter-substrate conducting terminal and the second inter-substrate conducting terminal.

In this way, the mounting terminal and the first driving electrode are connected only by the first wiring pattern. In addition, the mounting terminal and the second driving electrode are connected by the second wiring pattern, the first inter-substrate conducting terminal, the conductive particles, and the second inter-substrate conducting terminal.

However, a material, such as a transparent conductive film (for example, an indium tin oxide (ITO) film) forming the first driving electrode, has been used to form the first wiring pattern and the second wiring pattern.

The ITO film used to form the first and second wiring patterns has greater electrical resistance than a metal material does. As a result, wiring resistance of the first wiring pattern and the second wiring pattern becomes remarkably great.

The present invention has been made to address the aforementioned problem, and it is an object of the present invention to provide an electro-optical device and an electronic apparatus in which it is possible to reduce wiring resistance.

SUMMARY

To address the above problem, the present invention provides an electro-optical device comprising a first substrate, a second substrate opposite to the first substrate, first driving electrodes formed of a transparent conductive film on the first substrate, second driving electrodes formed of a transparent conductive film on the second substrate, and an electro-optical material layer formed by sealing an electro-optical material in a space demarcated by a sealing material between the first substrate and the second substrate, wherein a light reflecting film, a color filter layer, an organic insulating film covering and protecting the color filter layer, and an inorganic insulating film covering substantially the entire surface of the first substrate are sequentially formed between the first substrate and the first driving electrodes, wherein mounting terminals formed in a protruding region protruding from the second substrate, first inter-substrate conducting terminals formed in a region overlapping the second substrate, and a wiring pattern for connecting the mounting terminals to the first inter-substrate conducting terminals are disposed on the first substrate, wherein second inter-substrate conducting terminals electrically connected to the first inter-substrate conducting terminals are disposed on the second substrate in positions opposite to the first inter-substrate conducting terminals, with the sealing material therebetween, wherein at least a partial region of the wiring pattern includes a metal film formed of the same metal material as the light reflecting film and having sides rising in a substantially vertical direction, and has a structure wherein the metal film, the inorganic insulating film, and a conductive film formed of a transparent conductive film formed of the same material as the first inter-substrate conducting terminal are sequentially disposed on the first substrate, and wherein the sides of the metal film are exposed from the inorganic insulating film, the conductive film extends from the corresponding region and contacts the sides, and the first inter-substrate conducting terminals and the mounting terminals are electrically connected to the metal film through the conductive film making contact with the sides and are electrically connected to each other through the metal film.

As in the above structure, the wiring pattern for connecting the first inter-substrate conducting terminals to the mounting terminals is connected through the metal film and the conductive film making contact with the sides of the metal film.

As such, the wiring pattern reduces the electrical resistance of the wiring by the metal film.

To address the above problem, the present invention provides an electro-optical device comprising a first substrate, a second substrate opposite to the first substrate, first driving electrodes formed of a transparent conductive film formed on the first substrate, second driving electrodes formed of a transparent conductive film formed on the second substrate, and an electro-optical material layer formed by sealing an electro-optical material in a space demarcated by a sealing material between the first substrate and the second substrate, wherein a light reflecting film, a color filter layer, an organic insulating film covering and protecting the color filter layer, and an inorganic insulating film covering substantially the entire surface of the first substrate are sequentially formed between the first substrate and the first driving electrode, wherein mounting terminals formed in a protruding region protruding from the second substrate and a wiring pattern for connecting the mounting terminals to the first driving electrodes are disposed on the first substrate, wherein at least a partial region of the wiring pattern includes a metal film formed of the same metal material as the light reflecting film and having sides rising in a substantially vertical direction, and has a structure wherein the metal film, the inorganic insulating film, and a conductive film formed of a transparent conductive film formed of the same material as the first driving electrode are sequentially disposed on the first substrate, and wherein the sides of the metal film are exposed from the inorganic insulating film, the conductive film extends from the corresponding region and contacts the sides, and the first driving electrodes and the mounting terminals are electrically connected to the metal film through the conductive film making contact with the corresponding sides and are electrically connected to each other through the metal film.

As in the above structure, the wiring pattern for connecting the first driving electrodes to the mounting terminals is connected through the metal film and the conductive film making contact with the sides of the metal film. As such, the wiring pattern reduces the electrical resistance of the wiring by the metal film.

In the present invention, the electro-optical device further comprises an image display region formed of a plurality of pixels which are disposed to correspond to the intersections of the first driving electrodes and the second driving electrodes, wherein part of the wiring pattern near the image display region is coated with the organic insulating film layer, and the mounting terminals and the first inter-substrate conducting terminals are exposed to the outside of the organic insulating film.

In the present invention, the electro-optical device further comprises an image display region formed of a plurality of pixels which are disposed to correspond to the intersections of the first driving electrodes and the second driving electrodes, wherein part of the wiring pattern near the image display region is coated with the organic insulating film, and the mounting terminals are exposed to the outside of the organic insulating film.

In the present invention, in order to ensure electrical connection between the first driving electrodes and the mounting terminals, the area of the sides of the metal film exposed from the insulating film is increased.

Specifically, if the thickness of the metal film is a and the thickness of the inorganic insulating film is b, then, preferably, a/b>5.

In addition, the thickness a of the metal film may be a>100 nm, and the thickness b of the inorganic insulating film may be b<20 nm.

In the present invention, it is preferable that the wiring pattern has two or more portions in which the metal film and the conductive film are electrically connected to each other through the sides of the metal film exposed from the inorganic insulating film.

In the present invention, it is preferable that a portion of the metal film electrically connected to the conductive film through the sides of the metal film has a comb shape. As a result, by forming the portion in the comb shape, the area of the sides is increased, and the electrical contact area between the metal film and the conductive film is increased so that electrical resistance is further reduced.

In the present invention, it is preferable that the wiring pattern include a base adhering film having conductivity formed under the metal film, and the portion electrically connected to the conductive film through the sides of the metal film be formed in an isolated island-shaped pattern.

In the present invention, it is preferable that conductive particles for electrically connecting the first inter-substrate conducting terminals to the first inter-substrate conducting terminals be dispersed in the sealing material.

To address the above problem, the present-invention provides an electro-optical device in which an electro-optical material is interposed between a pair of opposed substrates, wherein a metal film formed of a metal material and having sides rising in a substantially vertical direction, an insulating film covering the metal film, and a wiring line straddling the sides of the metal film are sequentially disposed on one of the pair of opposed substrates, the sides of the metal film are exposed from the insulating film, and the metal film and the wiring line are electrically connected to each other through the sides.

As in the above structure, by electrically connecting the metal film and the wiring line through the sides of the metal film exposed from the insulating film, if the wiring line is on the right and left sides of the metal film, for example, two paths, that is, a path in which a current flows through the wiring line and a path in which a current flows from one side of the metal film to the other side of the metal film through the inside of the metal film, are formed so that wiring resistance is more sharply reduced in comparison to wiring resistance generated in a path in which the current flows only through the wiring line.

In the present invention, it is preferable that the metal material includes any one of silver alloy, aluminum alloy, and aluminum.

In the present invention, it is preferable that the metal material have a two-layer structure comprised of an upper layer formed of aluminum alloy or aluminum, and a lower layer formed of a molybdenum film or a molybdenum alloy film.

The electro-optical device according to the present invention may be used as a display unit of an electronic apparatus, for example.

BRIEF DESCRIPTION OF THE DRAWINGS

FIG. 1 is a perspective view of a liquid crystal display device according to an embodiment of the present invention.

FIG. 5 is an enlarged cross-sectional view of a portion (a) of FIG. 4(A).

DETAILED DESCRIPTION

The present invention will be further illustrated with embodiments below.

EMBODIMENTS

Overall Structure

Figure 2:
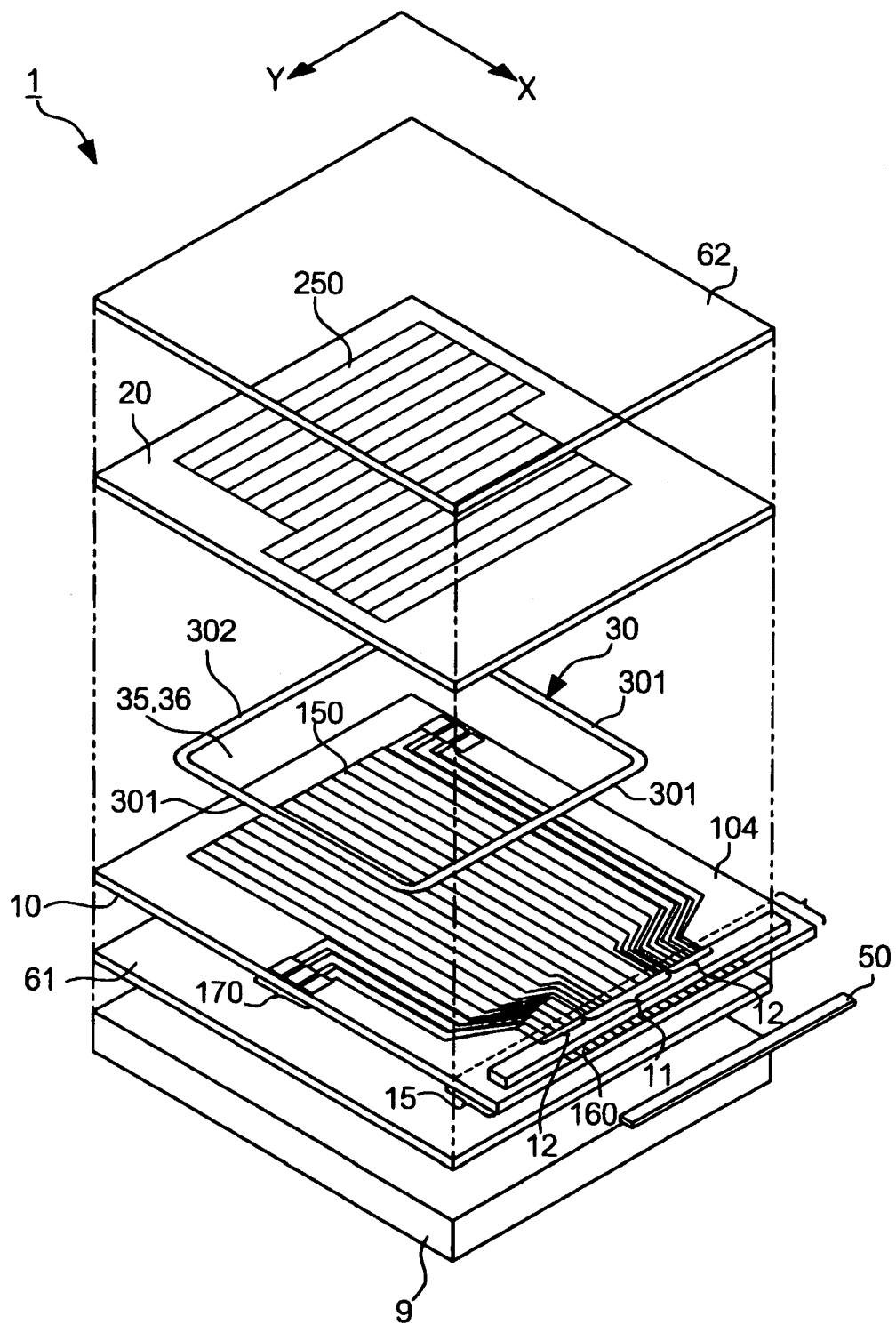
FIG. 2 is an exploded perspective view of the liquid crystal display device according to the embodiment of the present invention.

FIG. 1 is a perspective view of a liquid crystal display device 1 as an electro-optical device according to an embodiment of the present invention. FIG. 2 is an exploded perspective view of the liquid crystal display device 1. In the above drawings as well as in the drawings hereafter, in order to make each layer or each member recognizable in the drawings, the scale or number of each layer or each member is varied for convenience.

As shown in FIGS. 1 and 2, the liquid crystal display device 1 according to the present embodiment includes a first substrate 10 and second substrate 20 formed of a transparent material (for example, glass etc.) and having a rectangular shape with a predetermined gap disposed therebetween by a sealing material 30. A liquid crystal sealing region 35 is formed by the sealing material 30 between the first and second substrates 10 and 20, and liquid crystal, which is an electro-optical material, is sealed in the liquid crystal sealing region 35, thereby forming a liquid crystal layer 36 (an electro-optical material layer).

A plurality of first driving electrodes 150, which extend in a longitudinal direction (the X-direction of FIGS. 1 and 2) in an image display region 2 in which an image is displayed, are formed on the first substrate 10. A plurality of second driving electrodes 250, which extend in a horizontal direction (the Y-directions of FIGS. 1 and 3) in the image display region 2, are formed on the second substrate 20.

A polarizer 61 is bonded to an external surface of the first substrate 10, and a polarizer 62 is bonded to an external surface of the second substrate 20. In addition, a backlight device 9 is disposed at an outer side of the first substrate 10.

In the liquid crystal display device 1, comparing the first substrate 10 with the second substrate 20, the widthwise dimensions (the X-direction) are almost the same, and the lengthwise dimension (the Y-direction) of the first substrate 10 is longer than that of the second substrate 20. The first substrate 10 has a protruding region 15 extending from the second substrate 20 in a state where the first substrate 10 is bonded to the second substrate 20, and mounting terminals 160, on which a driver IC 50 is mounted, are grouped and arranged in the X-direction in the protruding region 15. In addition, a flexible substrate 8 is also mounted on the mounting terminals 160.

In addition, a first wiring pattern 11 is formed on the first substrate 10 from the mounting terminals 160 arranged near the center of the Y-direction, out of the mounting terminals 160, toward the first driving electrode 150 extending in the X-direction.

Figure 3:
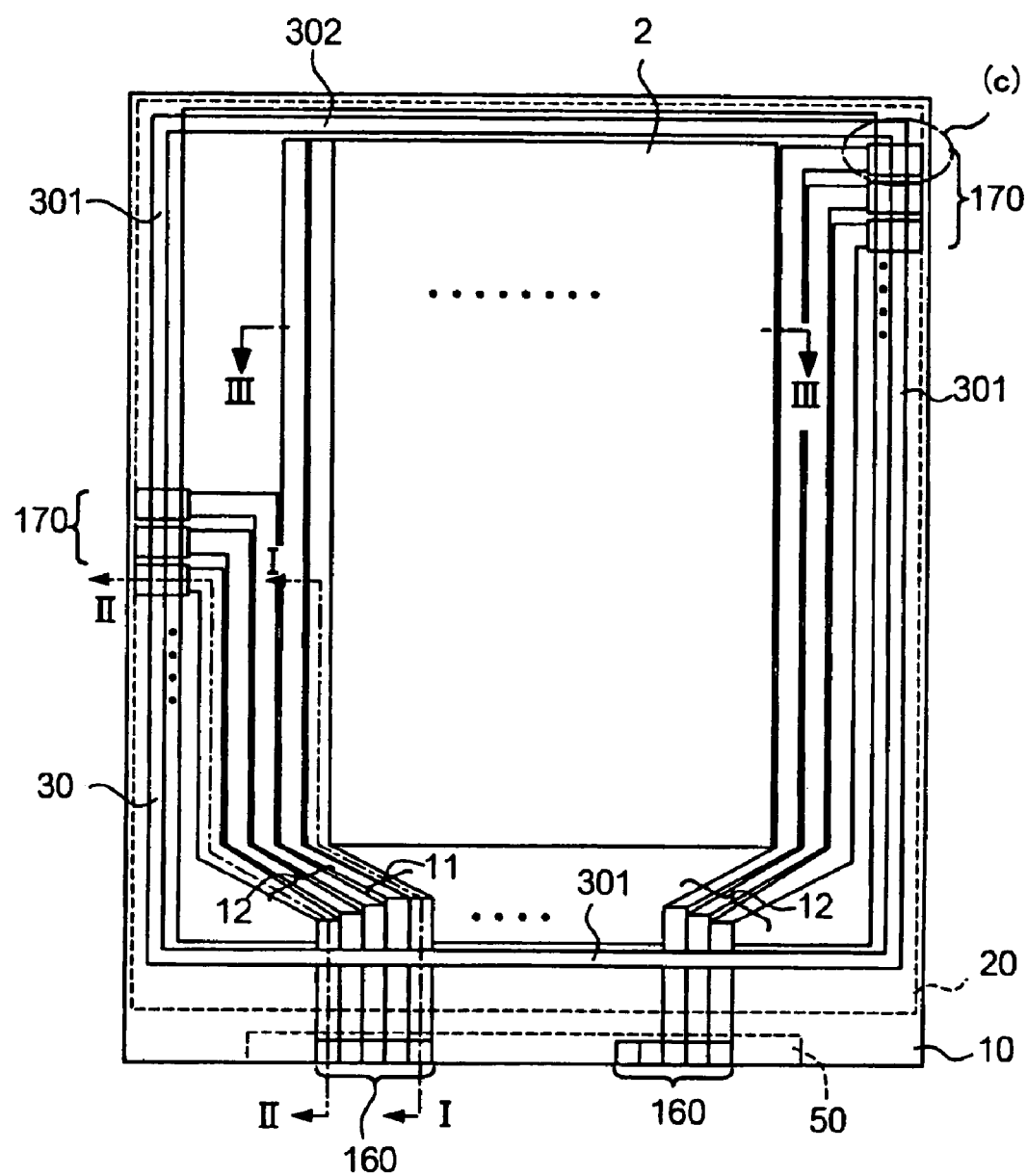
FIG. 3 is a plan view illustrating a structure of a first substrate used in the liquid crystal display device.

In addition, as shown in FIG. 3, on the first substrate 10, first inter-substrate conducting terminals 170 are grouped and arranged toward the Y-direction in a region overlapping the second substrate 20, at both sides of the Y-direction of the image display region 2. In addition, out of the mounting terminals 160 on which the driver IC 50 is mounted, the mounting terminals 160 arranged at both sides of the Y-direction are each connected to the first inter-substrate conducting terminals 170 by a second wiring pattern 12 passing outer side of a region in which the first wiring pattern 11 is formed.

With respect to this configuration, on the second substrate 20, second driving electrodes 250 extend in the Y-direction in the image display region 2, and the ends of the second driving electrodes 250 constitute second inter-substrate conducting terminals 270 (see FIG. 4) formed in the positions opposite to the first inter-substrate conducting terminals 170.

Structure of Substrate

The structure of the liquid crystal display device 1 as described above will be described with reference to FIG. 3 and FIGS. 4(A) and 4(B).

Figure 4A:
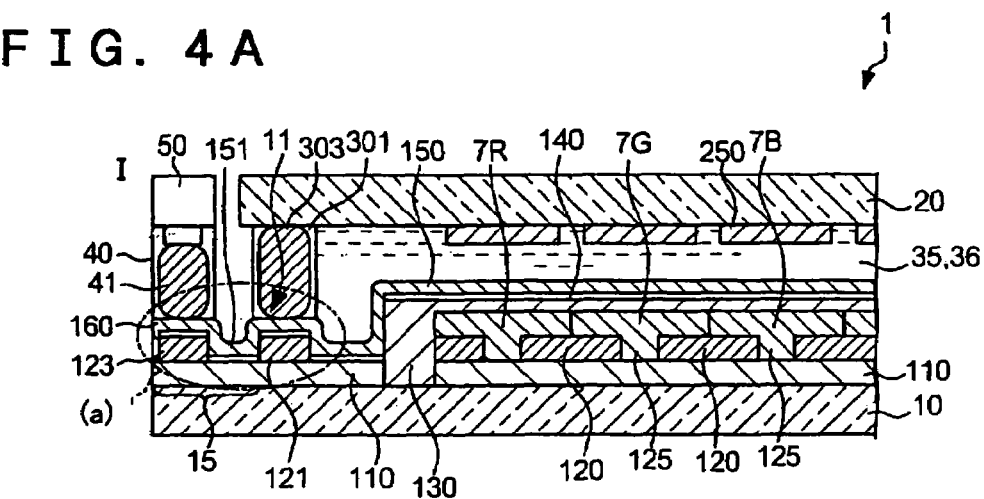
FIG. 4(A) is a cross-sectional view taken along line I—I of FIG. 3, and FIG. 4(B) are cross-sectional views taken along lines II—II and III—III of FIG. 3.

FIG. 3 is a plan view schematically illustrating a structure of the first substrate 10 used in an electro-optical device shown in FIG. 1. FIG. 4(A) is a cross-sectional view taken along line I—I of FIG. 3, and FIG. 4(B) shows cross-sectional views taken along lines II—II and III—III of FIG. 3.

Figure 4B:
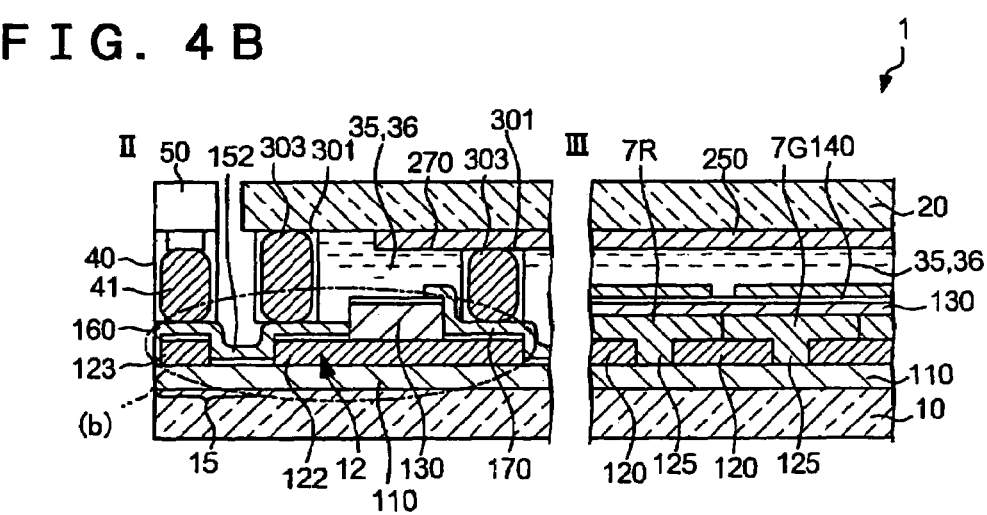

As shown in FIG. 3 and FIGS. 4(A) and 4(B), a base conductive film 110 formed of an indium tin oxide (ITO) film, a light reflecting film 120 formed of silver alloy or the like, color filter layers 7R, 7G, and 7B, an organic insulating film 130 as a planarization film, an inorganic insulating film 140 formed of a silicon oxide film or the like, a first driving electrode 150 formed of an ITO film, and an alignment film (not shown) are sequentially formed on the first substrate 10 from a lower layer side to an upper layer side.

On the other hand, a second driving electrode 250 formed of an ITO film and an alignment film (not shown) are sequentially formed on the second substrate 20.

The first and second substrates 10 and 20 are bonded to each other by the sealing material 30 in which spacers of a spherical shape are dispersed in a resin component. Here, the sealing material 30 is formed so as to determine the image display region 2, the inner side of which is filled with an electro-optical material, thereby forming a liquid crystal layer 36.

The sealing material 30 includes a sealing material 301 containing conductive particles, in which spherical spacers and conductive particles are dispersed in a resin component, and a sealing material 302 in which only spherical spacers are dispersed in the resin component. Among four sides of the sealing material 30, the sealing material 301 containing conductive particles is, applied on three sides in total, that is, on the both sides extending in the X-direction and on a side placed in the protruding region 15 and extending in the Y-direction, while the sealing material 302 in which only the spherical spacers are dispersed in the resin component, is applied on the remaining side.

In addition, as shown in FIG. 4(A), the base conductive film 110 extends not only in the lower layer side of the light reflecting film 120 but also from the lower layer side of the mounting terminal 160 to a position overlapping the second substrate 20 in the protruding region 15. In addition, as shown in FIG. 4(B), the base conductive film 110 extends from the lower layer side of the mounting terminal 160 to a lower layer side of the first inter-substrate conducting terminal 170.

As shown in FIG. 4(A), the light reflecting film 120 is partly removed in a position (hereinafter, referred to as a pixel) where the first driving electrode 150 and the second driving electrode 250 are opposite to each other and a light transmission hole 125 is formed.

As shown in FIG. 4(A), a metal film simultaneously formed with the light reflecting film 120, functions as a base electrode 123, in the portion placed at the lower layer side of the mounting terminal 160, and functions as a base electrode 121, in the portion placed in a region overlapping the sealing material 301. In addition, as shown in FIG. 4(B), the metal film simultaneously formed with the light reflecting film 120, functions as base electrode 122 of the second wiring pattern 12, in the portion extending from a position overlapping the sealing material 301 to the lower layer side of the first inter-substrate conducting terminal 170.

The color filter layers 7R, 7G, and 7B having colors, such as red, green, and blue, are formed at an upper side of the light reflecting film 120. The color filter layers 7R, 7G, and 7B are formed by dispersing color materials in resin. In each of the pixels, the thickness of the region in which the light reflecting film 120 is removed and the light transmission hole 125 is formed, becomes larger than that of the region in which the light reflecting film 120 is formed.

The thick organic insulating film 130 is formed as a planarization film at the upper sides of the color filter layers 7R, 7G, and 7B. Since the organic insulating film 130 is formed to planarize the first substrate 10 in the image display region 2, the organic insulating film 130 is formed to avoid the positions where the mounting terminal 160, the first inter-substrate conducting terminal 170, and the sealing material 30 are disposed.

In addition, the inorganic insulating film 140, formed of a thin silicon oxide film, is formed at an upper side of the organic insulating film 130 to cover the entire surface of the first substrate 10.

As shown in FIG. 4(A), the first driving electrode 150 formed of an ITO film, is formed in the image display region 2 at the upper side of the inorganic insulating film 140. As shown in FIG. 4(A), the ITO film simultaneously formed with the first driving electrode 150 functions as the first wiring layer 11 from the mounting terminal 160 to a portion overlapping the sealing material 301.

In addition, as shown in FIG. 4(B), the ITO film simultaneously formed with the first driving electrode 150 functions as an upper wiring 152, in the portion extending from the mounting terminal 160 to the sealing material 301, and functions as the first inter-substrate conducting terminal 170, in the portion opposite to the second inter-substrate conducting terminal 270.

Structure of Wiring Pattern

Figure 6:
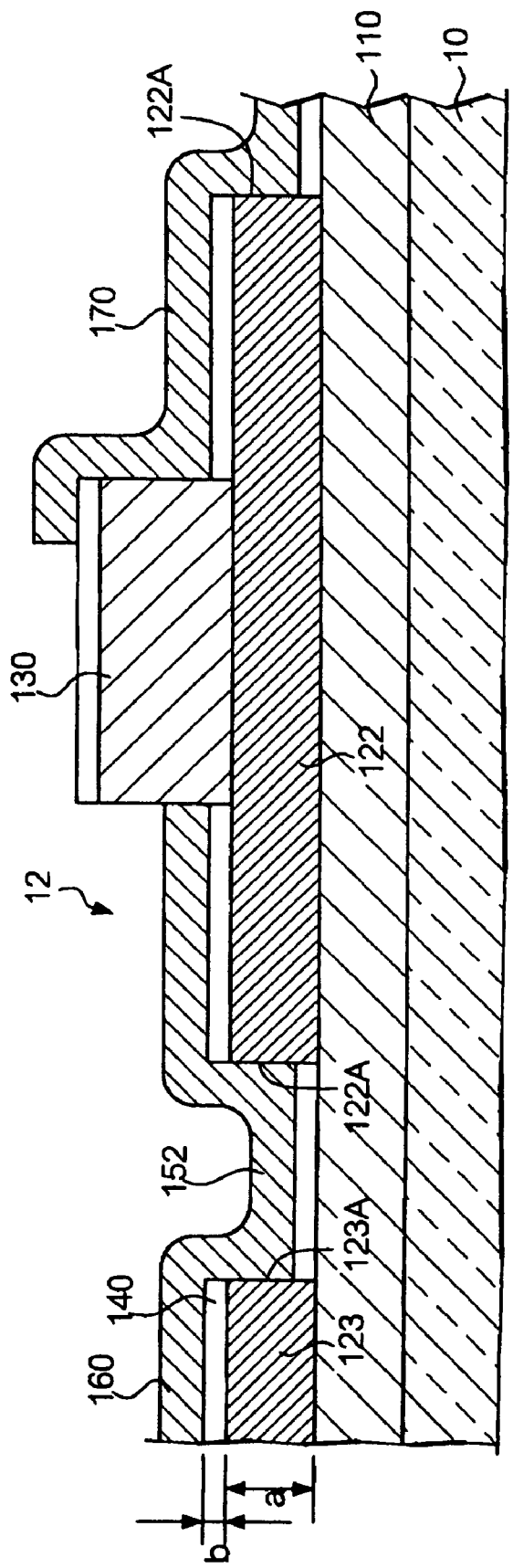
FIG. 6 is an enlarged cross-sectional view of a portion (b) of FIG. 4(B).
Figure 7:
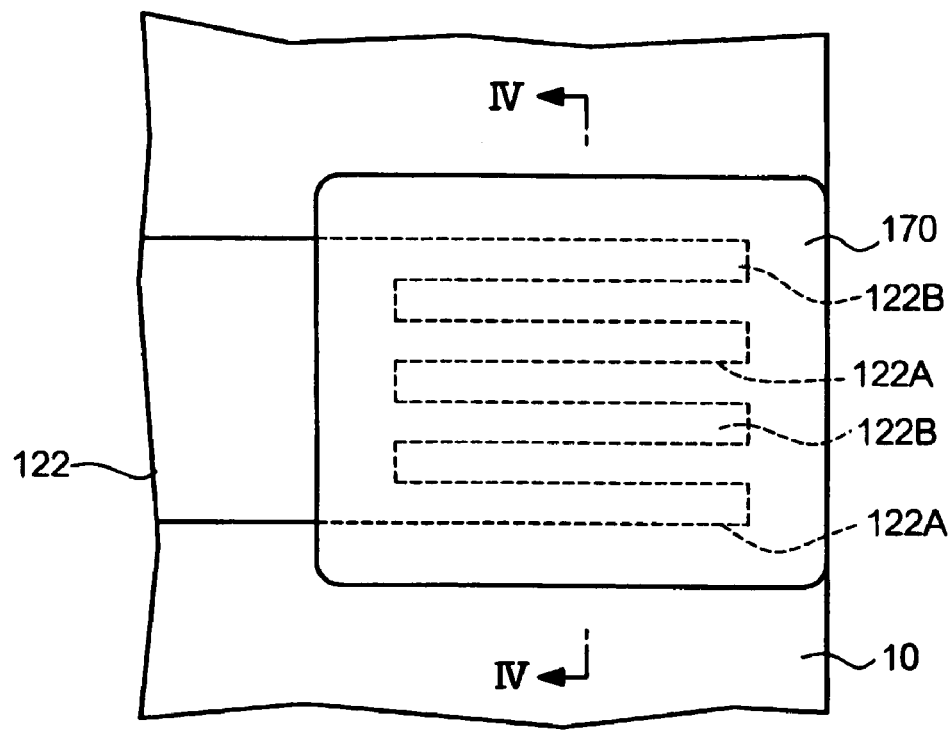
FIG. 7 is an enlarged cross-sectional view of a portion (c) of FIG. 3.
Figure 8:
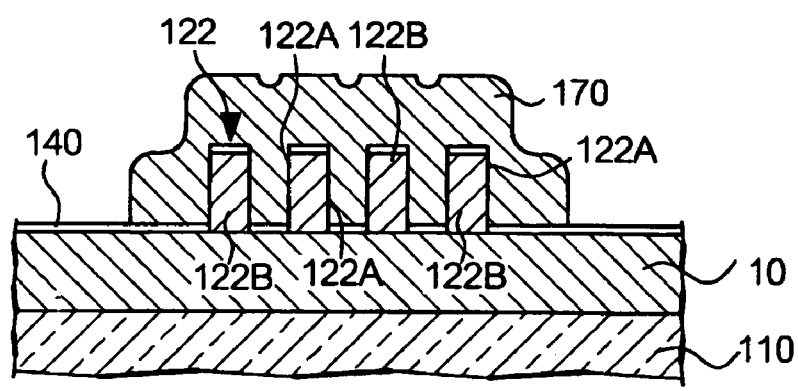
FIG. 8 is a cross-sectional view taken along line IV—IV of FIG. 7.

Next, the first wiring pattern 11 and the second wiring pattern 12, which are features of the present invention, will be described with reference to FIGS. 5 to 8. FIG. 5 is an enlarged view of a portion (a) of FIG. 4(A). FIG. 6 is an enlarged view of a portion (b) of FIG. 4(B). FIG. 7 is an enlarged view of a portion (c) of FIG. 3. FIG. 8 is a cross-sectional view taken along line IV—IV of FIG. 7.

Here, sides 121A and 121A, rising in a substantially vertical direction, are formed in the base electrode 121, and a side 123A rising in a substantially vertical direction is formed in the base electrode 123. In addition, sides 122A and 122A, rising in a substantially vertical direction, are formed in the base electrode 122.

In addition, the thickness a of the metal film which functions as the base electrodes 121 to 123 is about 100 nm, and the thickness b of the inorganic insulating film 140 is about 20 nm. For that reason, in the process of forming the inorganic insulating film 140 on the metal film, due to a difference in the thickness of the films, the inorganic insulating film 140 is prevented from being attached to each side of the metal film.

Therefore, as shown in FIG. 5, the inorganic insulating film 140 is not attached to the side 121A of the base electrode 121. Thereby, the first wiring pattern 11 straddling the base electrode 121 is electrically connected to the base electrode 121 through each side 121A. The inorganic insulating film 140 is not attached to the side 123A of the base electrode 123. Thereby, the first wiring pattern 11 straddling the base electrode 123 is electrically connected to the base electrode 123 through the side 123A.

Here, considering the path from the mounting terminal 160 to the first driving electrode 150, there are provide two paths: a path in which a current flows through the upper wiring 151 of the first wiring pattern 11, and a path in which a current flows through one side 121A of the base electrode 121, base electrode 121, and then the other side 121A of the base electrode 121. In particular, since the base electrode 121 is formed of a metal material, the resistance of the first wiring pattern is sharply reduced in comparison to the wiring resistance generated in the path in which the current flows through the upper wiring 151.

Next, the second wiring pattern 12 for connecting the upper wiring 152 connected to the mounting terminal 160 to the first inter-substrate conducting terminal 170 includes the base electrode 122, as shown in FIG. 6. Since the inorganic insulating film 140 is not attached to the side 122A of the base electrode 122, the upper wiring 152 and the first inter-substrate conducting terminal 170 on each side 122A of the base electrode 122 are electrically connected to the base electrode 122 through each side 122A.

Considering the path from the mounting terminal 160 to the first inter-substrate conducting terminal 170, there is provided a path in which a current flows through:the upper wiring 152, one side 122A of the base electrode 122, base electrode 122, the other side 122A of the base electrode 122, and then first inter-substrate conducting terminal 170.

In this way, since the second wiring pattern 12 is formed using the base electrode 122 formed of a metal film, the wiring resistance of the second wiring pattern is sharply reduced.

In addition, as shown in FIGS. 7 and 8, the front end of the base electrode 122 is formed in a comb shape, having teeth portions 122B and 122B. In this way, the front end of the base electrode 122 has a comb shape so that the area of the side 122A is increased and the contact area between the first inter-substrate conducting terminal 170 and the base electrode 122 is increased. As a result, the current flowing from the first inter-substrate conducting terminal 170 to the base electrode 122 is increased, and further, the wiring resistance is further reduced.

It is understood that the comb shape of the base electrode 122 may be applied to the base electrodes 121 and 123.

Manufacturing Method

Next, a method for manufacturing the first and second substrates 10 and 20 constituting the liquid crystal display device 1 according to the present embodiment will be described with reference to FIGS. 9, 10, and 11.

FIGS. 9(A) to 9(F) illustrate each of elements formed on the first and second substrates used in the liquid crystal display device 1 of FIG. 1, respectively. FIGS. 10(A) to 10(F) and FIGS. 11(A) to 11(F) are cross-sectional views illustrating a method for manufacturing the first and second substrates used in the liquid crystal display device 1 of FIG. 1, respectively. In the image display region of FIGS. 9(B), 9(C), and 9(D), a plurality of pixels in a rectangular frame are shown enlarged and schematically.

Figure 9A:
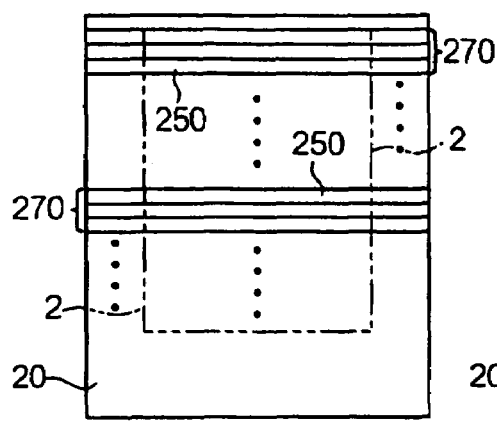
FIGS. 9(A) to 9(F) are explanatory views illustrating each of elements formed on the first and second substrates used in the liquid crystal display device of FIG. 1.

First, as shown in FIG. 9(A), in order to manufacture the second substrate 20, an ITO film is formed on the entire surface of the substrate and then is patterned using a photolithography technique, and second driving electrodes 250 extending in the horizontal direction (the Y-direction) are formed in an image display region 2. Here, the ends of the second driving electrodes 250 function as the second inter-substrate conducting terminals 270.

Figure 9B:
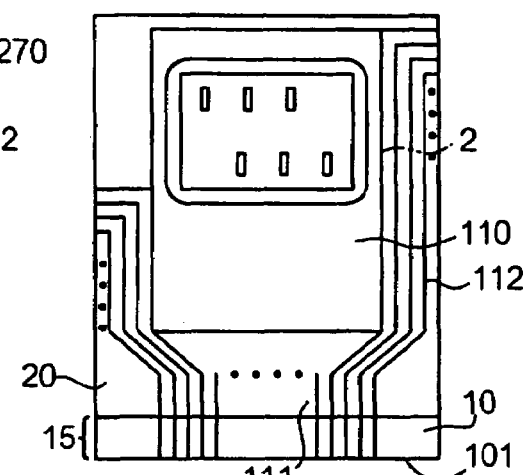
Figure 10A:
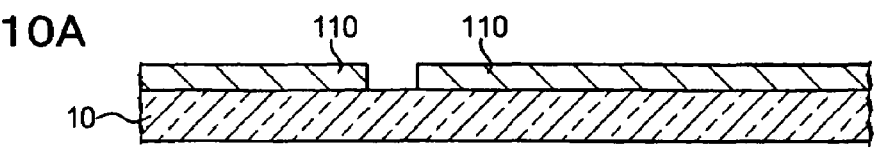
FIGS. 10(A) to 10(F) are process charts illustrating a method for manufacturing the first substrate used in the liquid crystal display device of FIG. 1 corresponding to FIG. 4(A).
Figure 11A:
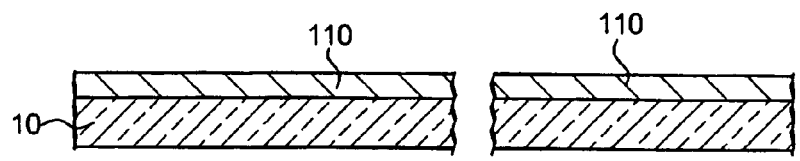
FIGS. 11(A) to 11(F) are process charts illustrating a method for manufacturing the first substrate used in the liquid crystal display device of FIG. 1 corresponding to FIG. 4(B).

On the other hand, in manufacturing the first substrate 10, first, as shown in FIGS. 9(B), 10(A), and 11(A), the ITO film is formed on the entire surface of the substrate and is patterned using the photolithography technique, and a base conductive film 110 (FIG. 9(B)) is formed as a rectangular region in the image display region 2. In addition, the base conductive film 110 is formed in a portion from a lower layer side of the mounting terminal 160 to a position overlapping the second substrate 20 and in a portion extending from the lower layer side of the mounting terminal 160 to a lower layer side of the first inter-substrate conducting terminal 170.

Figure 9C:
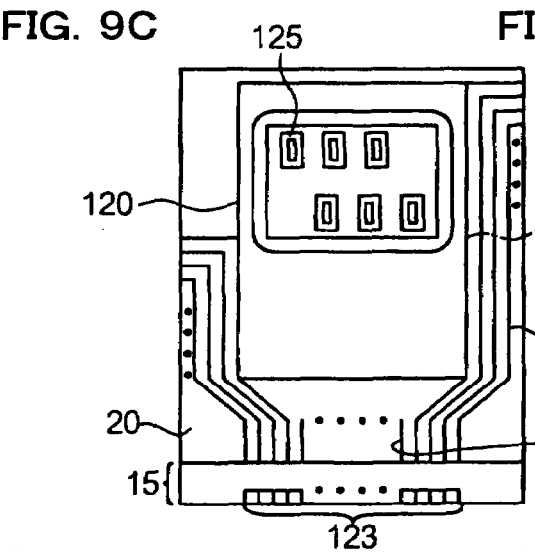
Figure 10B:
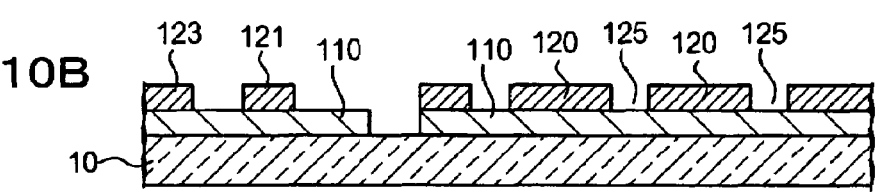
Figure 11B:
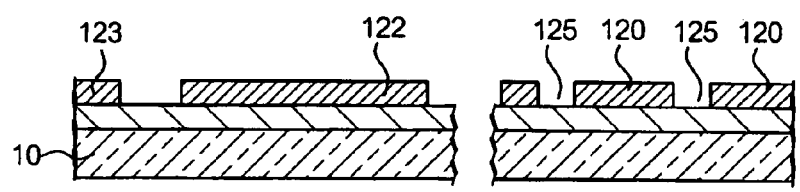

Next, as shown in FIGS. 9(C), 10(B), and 11(B), a metal film formed of silver alloy or the like is formed at an upper side of the base conductive film 110 and is patterned using the photolithography technique, and a light reflecting film 120 (FIG. 9(C)) is formed in the image display region 2. In this case, part of a region, in which the first driving electrode 150 and the second driving electrode 250 are opposite to each other, is removed, and a light transmission hole 125 is formed in the light reflecting film 120.

In addition, the metal film simultaneously formed with the light reflecting film 120 is left as the base electrode 123 at the lower layer side of a region where the mounting terminal 160 is to be formed, and also is left as the base electrode 121 in a region overlapping the second substrate 20. In addition, the metal film simultaneously formed with the light reflecting film 120 is left as the base electrode 122 functioning as the second wiring pattern 12 from a region overlapping the second substrate 20 to the first inter-substrate conducting terminal 170.

Here, since the base conductive film 110 is formed at the lower layer side of the metal film constituting the light reflecting film 120, even when the adhesive property between the metal film and the substrate is low, the patterning precision of the light reflecting film 120 is not lowered and peeling thereof does not occur.

Figure 9D:
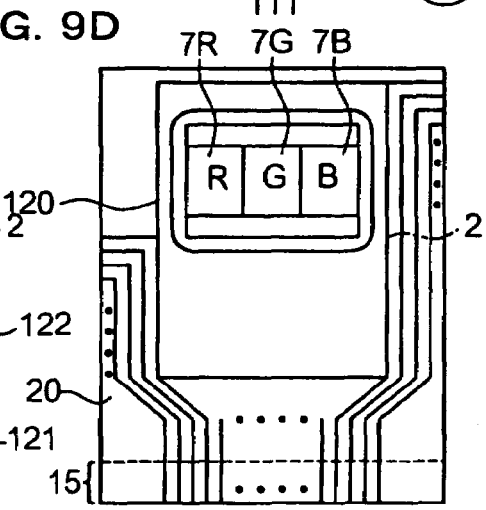
Figure 10C:
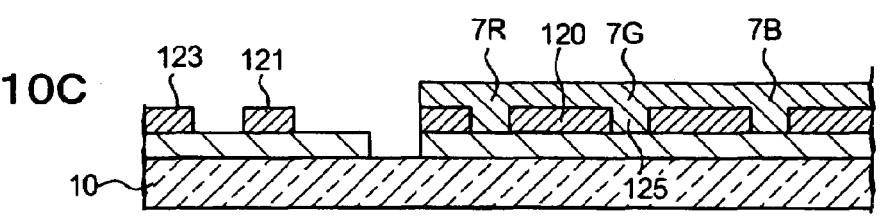
Figure 11C:
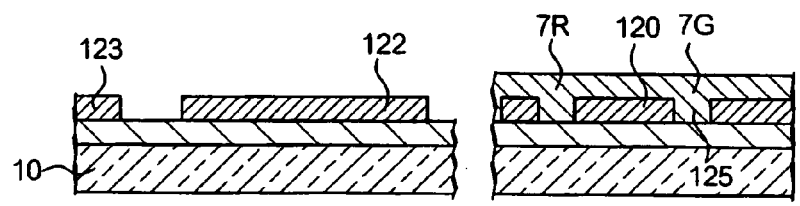

Next, as shown in FIGS. 9(D), 10(C), and 11(C), color filter layers 7R, 7G, and 7B having colors, such as R (red), G (green), and B (blue), are formed in a predetermined position of the image display region 2 at the upper side of the light reflecting film 120. The color filter layers 7R, 7G, and 7B are formed by dispersing color materials in resin. In each pixel, the thickness of a region in which the light reflecting film 120 is removed and the light transmission hole 125 is formed, becomes larger than that of the region in which the light reflecting film 120 is formed.

Figure 9E:
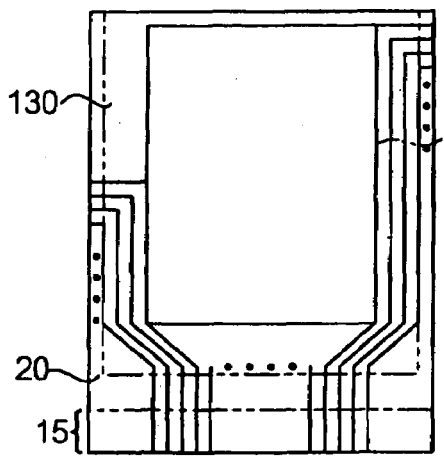
Figure 10D:
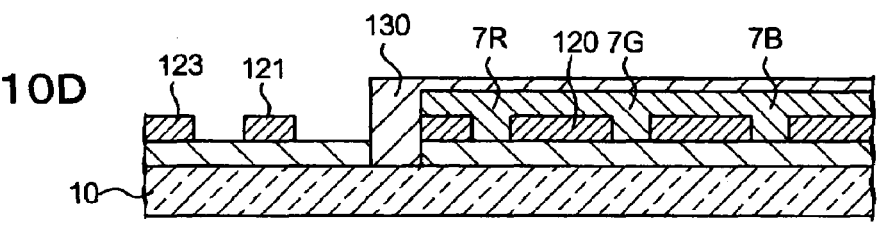
Figure 11D:
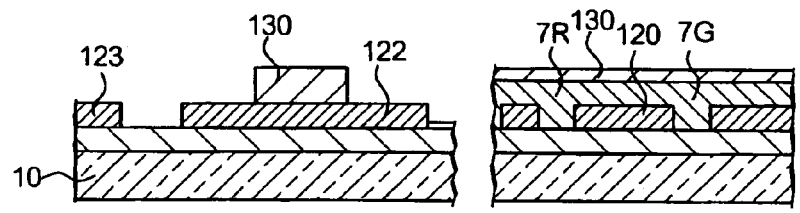

Next, as shown in FIGS. 9(E), 10(D), and 11(D), the thick organic insulating film 130 is formed at the upper sides of the color filter layers 7R, 7G, and 7B and then is patterned using the photolithography technique such that the organic insulating film 130 is selectively left in the image display region 2 and is not left on the outer circumference of the image display region. As a result, the organic insulating film 130 is formed to avoid the position where the mounting terminal 160 and the first inter-substrate conducting terminal 170 are disposed as well as the region where the sealing material 30 is applied.

Figure 10E:
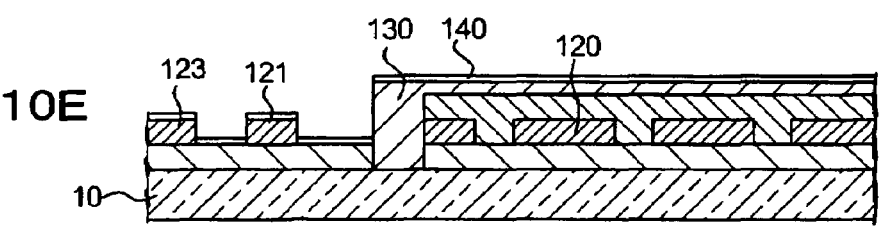
Figure 11E:
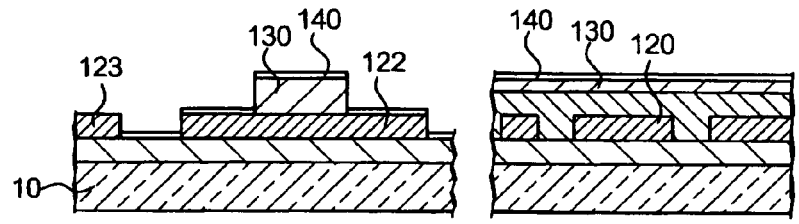

Next, as shown in FIGS. 10(E) and 11(E), the inorganic insulating film 140 formed of a thin silicon oxide film is formed on the entire surface of the substrate, at an upper side of the organic insulating film 130.

In this case, as described above, because of the thickness of the inorganic insulating film 140, the inorganic insulating film 140 is not easily attached to the sides of the base electrodes 121 to 123.

Figure 9F:
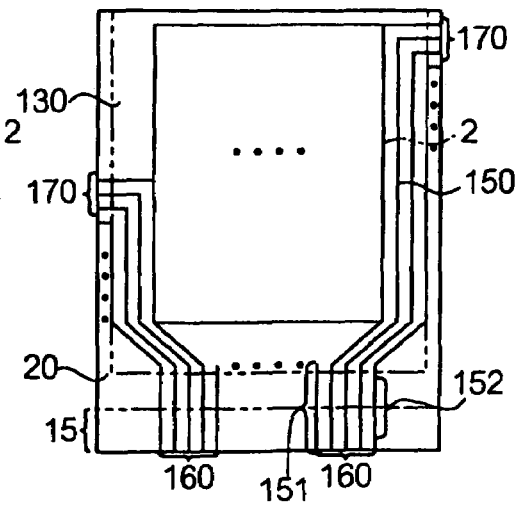
Figure 10F:
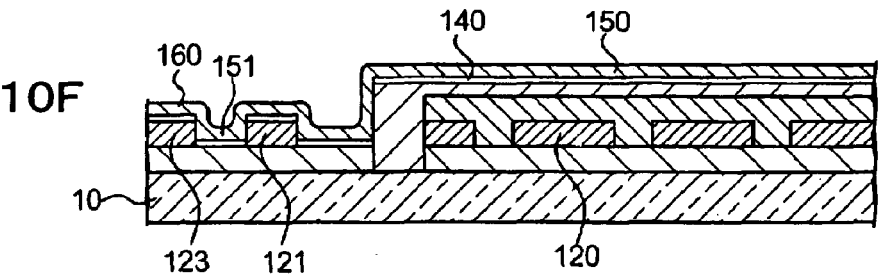
Figure 11F:
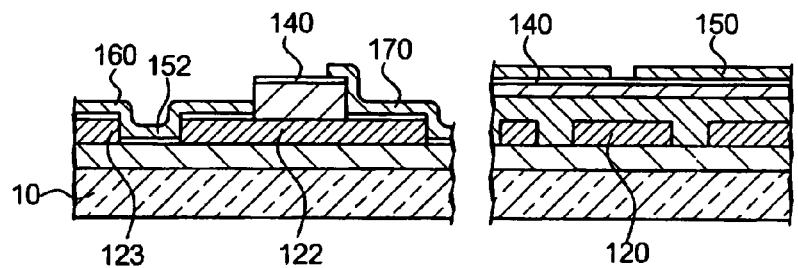

Next, as shown in FIGS. 9(F), 10(F), and 11(F), an ITO film is formed on the entire surface of the substrate at the upper side of the inorganic insulating film 140, is patterned using the photolithography technique, and the first driving electrode 150 is formed in the image display region 2. In addition, the ITO film simultaneously formed with the first driving electrode 150 is left as the mounting terminal 160 and the first inter-substrate conducting terminal 170.

In addition, the ITO film simultaneously formed with the first driving electrode 150 is left as an upper wiring 151 of the first wiring pattern 11 from the mounting terminal 160 to a region overlapping the second substrate 20.

When etching, the metal film constituting the light reflecting film 120 is not exposed to the outside. Therefore, the silver alloy film constituting the light reflecting film 120 is not corroded by the etchant used for the ITO film.

Mounting structure of IC and inter-substrate conducting structure

As shown in FIG. 4(A), a driver IC 50 is mounted on the mounting terminals 160 by an anisotropic conductive film 40 in which conductive particles 41 are combined in a resin component. In this case, although the thin inorganic insulating film 140 formed of a silicon oxide film is formed at the lower layer side of the mounting terminals 160, the base electrode 123 formed of a metal film which is simultaneously formed with the light reflecting film 120, is formed at the lower side of the inorganic insulating film.

Therefore, when the driver IC 50 contacts the mounting terminals 160 of the first substrate 10 through the anisotropic conductive film 40, the mounting terminals 160 are electrically connected to the base electrode 123 through the side 123A of the base electrode 123, and the base electrode 123 is electrically connected to the base conductive film 110.

In addition, as shown in FIG. 4(B), the sealing material 301 containing conductive particles 303 is interposed between the first inter-substrate conducting terminals 170 and the second inter-substrate conducting terminals 270. The first inter-substrate conducting terminals 170 and the second inter-substrate conducting terminals 270 are electrically connected through the sealing material 301. In addition, since the first inter-substrate conducting terminals 170 are connected to the mounting terminals 160 through the base electrode 122, the second driving electrodes 250 are connected to the mounting terminals 160 in a path in the order of the second inter-substrate conducting terminals 270, conductive particles 303 (sealing material 301), first inter-substrate conducting terminals 170, base electrode 122 (second wiring pattern 12), and upper wiring 12.

In the liquid crystal display device 1 having the above structure, if a signal is output from the driver IC 50, a signal output from each of the mounting terminals 160 placed in the center of the Y-direction, is supplied to the first driving electrodes 150 through the first wiring pattern 11 having the upper wiring 151 and the base electrode 121.

On the other hand, a signal output from the mounting terminals 160 formed at both sides in the Y-direction out of the mounting terminals 160, is transferred through the upper wiring 152 and the base electrode 122, and then is supplied to the second driving electrodes 250 in a region overlapping the second substrate 20 through the first inter-substrate conducting terminals 170, the conductive particles 303, and the second inter-substrate conducting terminal 270.

As a result, the alignment state of the liquid crystal layer 36 is controlled for each pixel at the portions where the first driving electrodes 150 and the second driving electrodes 250 are opposite to each other. Therefore, external light incident from the second substrate 20 side is optically modulated while it is reflected by the light reflecting film 120 and emitted from the second substrate 20, to display an image (reflective mode). In addition, since the light transmission hole 125 is formed in the light reflecting film 120 formed at the lower side of the first driving electrodes 150, light emitted from the backlight device 9 arranged at the rear side of the first substrate 10 passes through the light transmission hole 125, is incident on the liquid crystal layer 36, and is optically modulated while the light is emitted from the second substrate 20, to display an image (transmissive mode).

In this case, in the liquid crystal display device according to the present embodiment, since in the first substrate 10, the color filter layers 7R, 7G, and 7B are formed at a portion overlapping the region where the first driving electrodes 150 and the second driving electrodes 250 are opposite to each other, a color image can be displayed.

Effect of the Present Embodiment

As described above, a bypass path is formed, using the base electrode 121 formed of a metal film, in the way of the first wiring pattern 11 for connecting the mounting terminals 160 to the first driving electrodes 150. As a result, the wiring resistance of the first wiring pattern 11 for connecting the mounting terminals 160 to the first driving electrodes 150 is sharply reduced in comparison to the case in which the first wiring pattern is connected only to the upper wiring 151.

In addition, since the second wiring pattern for connecting the mounting terminals 160 to the second inter-substrate conducting terminals 270 includes the base electrode 122 formed of a metal film, the wiring resistance thereof is sharply reduced.

In this way, wiring resistance is sharply reduced so that power consumption in wiring is reduced and the life span of a battery or a cell is sharply increased.

Modification

Although a silver alloy film and an aluminum film are used as a light reflecting film in the present embodiment, a multi-layer structure of an aluminum alloy film or a molybdenum film, or a molybdenum alloy film and an aluminum film or an aluminum alloy film may be used as the light reflecting film.

In addition, the relation between the thickness a of the metal film and the thickness b of the insulating film is satisfied by a>100 nm and b<20 nm, or a/b>5. By adjusting the film thickness in this manner, it is possible to actively prevent the insulating film from attaching to the sides of the metal film.

The electro-optical device according to the present invention is applicable to an electroluminescent device, in particular, an organic electroluminescent device, an inorganic electroluminescent device, or a plasma display device, a field emission display (FED) device, a light emitting diode (LED) display device, an electrophoresis display device, a thin type Braun tube, a small-sized TV using a liquid crystal shutter, and a device using a digital micromirror device (DMD), as well as the above-described liquid crystal display device.

Application to Electronic Apparatus

Next, an example of an electronic apparatus having an electro-optical device according to the present invention will be described with reference to FIG. 12.

Figure 12:
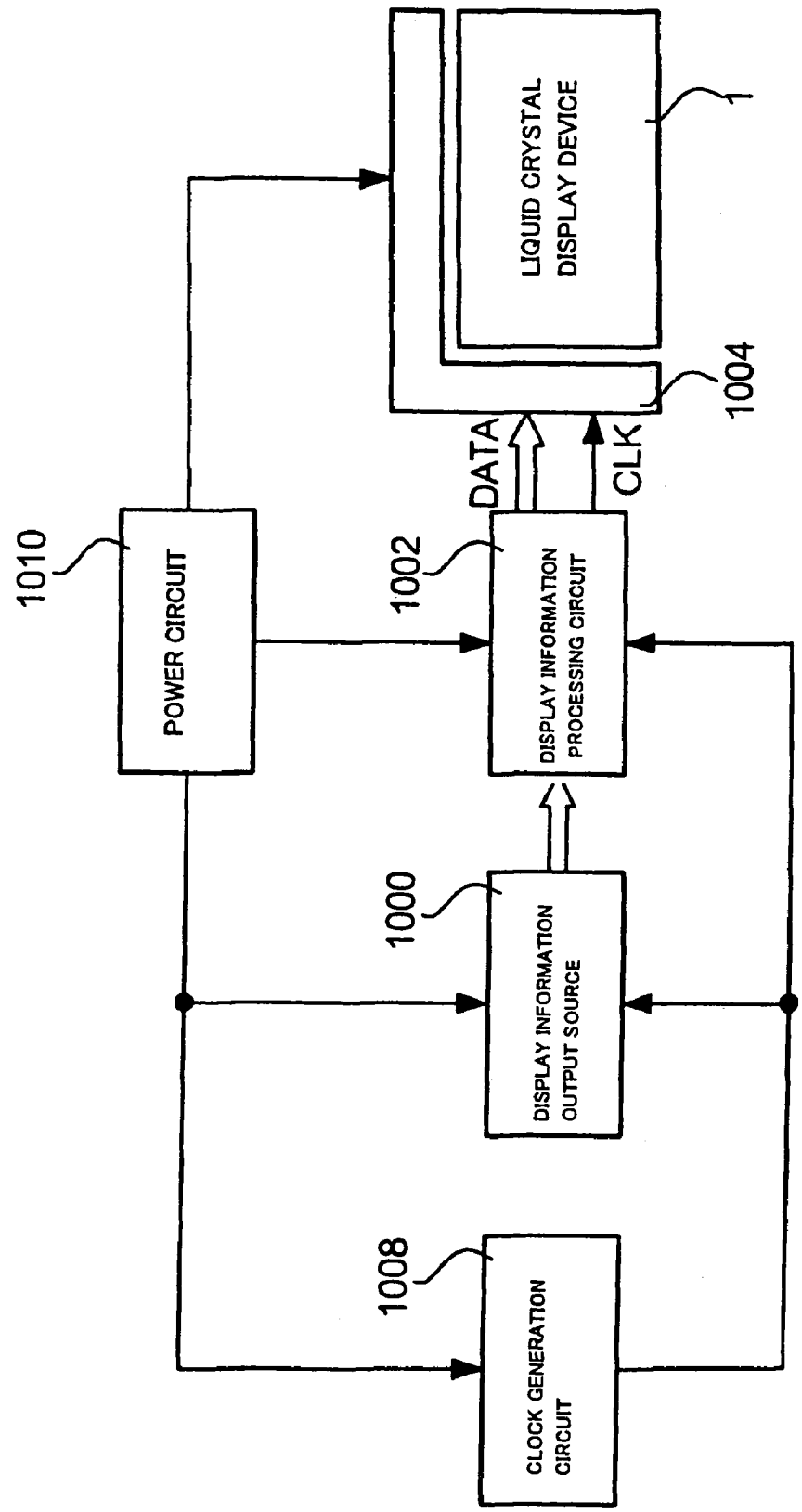
FIG. 12 is a block diagram illustrating an electrical structure of an electronic apparatus using a liquid crystal display device according to the present invention.

FIG. 12 is a block diagram illustrating a structure of an electronic apparatus comprising a liquid crystal display device 1 having the same structure as the above-described electro-optical device.

In FIG. 12, an electronic apparatus comprises a display information output source 1000, a display information processing circuit 1002, a driving circuit 1004 having a control circuit for converting a display mode, a liquid crystal display device 1, a clock generation circuit 1008, and a power circuit 1010. The display information output source 1000 comprises memory, such as read only memory (ROM), random access memory (RAM), and an optical disc, and a tuning circuit for tuning image signals of television signals and outputting the signals. The display information output source 1000 processes image signals having a predetermined format and outputs to the display information processing circuit 1002 on the basis of the clock generated from the clock generation circuit 1008. The display information processing circuit 1002 comprises a variety of well-known processing circuits, for example, an amplification-polarity reversing circuit, a phase development circuit, a rotation circuit, a gamma correction circuit or a clamp circuit. The display information processing circuit 1002 sequentially generates a digital signal from display information input on the basis of the clock signal and outputs it to the driving circuit 1004 together with a clock signal CLK. The driving circuit 1004 drives the liquid crystal display device 1. The power circuit 1010 supplies a predetermined power to each of the above circuits.

Examples of the electronic apparatus constructed as described above include a mobile personal computer, a mobile phone, a multi-media personal computer (PC), an engineering work station (EWS), a pager or a portable telephone, a word processor, a television, a view finder type or monitor direct-viewing type video tape recorder, an electronic data book, an electronic desktop calculator, a car navigation device, a POS terminal, an apparatus with a touch panel, and the like.

ADVANTAGES

As described above, in the electro-optical device according to the present invention, a metal film and a wiring line are electrically connected through the sides of the metal film exposed from an insulating film. As a result, for example, when the wiring line straddles the right and left sides of the metal film, two paths, that is, a path in which a current flows through the wiring line and a path in which a current flows from one side of the metal film to the other side of the metal film trough the inside of the metal film, are formed so that wiring resistance is sharply reduced in comparison to the wiring resistance generated in a path in which the current flows only through the wiring line.

What is claimed is:

1. An electro-optical device comprising:
   a first substrate;
   a second substrate opposite the first substrate;
   a first driving electrode formed of a transparent conductive film on the first substrate;
   a second driving electrode formed of a transparent conductive film on the second substrate; and
   an electro-optical material layer including an electro-optical material sealed in a space demarcated by a sealing material between the first substrate and the second substrate,
   wherein a light reflecting film, a color filter layer, an organic insulating film covering the color filter layer and protecting the color filter layer, and an inorganic insulating film covering substantially an entire surface of the first substrate, are sequentially formed between the first substrate and the first driving electrode, and
   wherein a mounting terminal formed in a protruding region protruding from the first substrate, a first inter-substrate conducting terminal formed in a region overlapping the second substrate, and a wiring pattern for connecting the mounting terminal to the first inter-substrate conducting terminal are disposed on the first substrate,
   wherein a second inter-substrate conducting terminal electrically connected to the first inter-substrate conducting terminal is disposed in a position opposite the first inter-substrate conducting terminal of the second substrate, with the sealing material therebetween,
   wherein at least a partial region of the wiring pattern includes a metal film formed of the same metal material as the light reflecting film and having a side rising in a substantially vertical direction, and has a structure wherein the metal film, the inorganic insulating film, and a conductive film formed of a transparent conductive film formed of the same material as the first inter-substrate conducting terminal are sequentially disposed on the first substrate, and
   wherein the side of the metal film is exposed from the inorganic insulating film, the conductive film extends from the corresponding region and contacts a corresponding side, and the first inter-substrate conducting terminal and the mounting terminal are electrically connected to the metal film through the conductive film making contact with the corresponding side and are electrically connected to each other through the metal film.

2. The electro-optical device according to claim 1, further comprising:
   an image display region, formed of a plurality of pixels, disposed to correspond to a region in which the first driving electrode and the second driving electrode overlap each other,
   wherein part of the wiring pattern near the image display region is coated with the organic insulating film layer, and the mounting terminal and the first inter-substrate conducting terminal are exposed to the outside of the organic insulating film.

3. The electro-optical device according to claim 1,
   wherein, if the thickness of the metal film is a and the thickness of the inorganic insulating film is b, then $a/b>5$.

4. The electro-optical device according to claim 1,
   wherein the thickness a of the metal film satisfies $a>100$ nm, and the thickness b of the inorganic insulating film satisfies $b<20$ nm.

5. The electro-optical device according to claim 1,
   wherein the wiring pattern has two or more portions in which the metal film and the conductive film are electrically connected to each other through the side of the metal film exposed from the inorganic insulating film.

6. The electro-optical device according to claim 1,
   wherein the portion of the metal film electrically connected to the conductive film through the side of the metal film has a comb shape.

7. The electro-optical device according to claim 1,
   wherein the wiring pattern includes a conductive base adhering layer formed under the metal film, and
   wherein the portion of the metal film electrically connected to the conductive film through the side of the metal film is formed in an isolated island-shaped pattern.

8. The electro-optical device according to claim 1,
   wherein conductive particles for electrically connecting the first inter-substrate conducting terminal to the second inter-substrate conducting terminal are dispersed in the sealing material.

9. The electro-optical device according to claim 1,
   wherein the metal material includes at least one of silver alloy, aluminum alloy, and aluminum.

10. The electro-optical device according to claim 1,
wherein the metal material has a two-layer structure of an upper layer formed of aluminum alloy or aluminum and a lower layer formed of a molybdenum film or a molybdenum alloy film.

11. An electro-optical device comprising:
a first substrate;
a second substrate opposite the first substrate;
a first driving electrode formed of a transparent conductive film on the first substrate;
a second driving electrode formed of a transparent conductive film on the second substrate;
an electro-optical material layer including an electro-optical material sealed in a space demarcated by a sealing material between the first substrate and the second substrate,
wherein a light reflecting film, a color filter layer, an organic insulating film covering the color filter layer and protecting the color filter layer, and an inorganic insulating film covering substantially the entire surface of the first substrate are sequentially formed between the first substrate and the first driving electrode,
wherein a mounting terminal formed in a protruding region protruding from the first substrate and a wiring pattern for connecting the mounting terminal to the first driving electrode are disposed on the first substrate, and
wherein at least a partial region of the wiring pattern includes a metal film formed of the same metal material as the light reflecting film and having a side rising in a substantially vertical direction, and has a structure wherein the metal film, the inorganic insulating film, and a conductive film formed of a transparent conductive film formed of the same material as the first driving electrode are sequentially disposed on the first substrate, and
wherein the side of the metal film is exposed from the inorganic insulating film, the conductive film extends from the corresponding region and contacts a corresponding side, and the first driving electrode and the mounting terminal are electrically connected to the metal film through the conductive film making contact with the corresponding side and are electrically connected to each other through the metal film.

12. The electro-optical device according to claim 11, further comprising:
an image display region, formed of a plurality of pixels, disposed to correspond to a region in which the first driving electrode and the second driving electrode overlap each other, and
wherein part of the wiring pattern near the image display region is coated with the organic insulating film layer, and the mounting terminal is exposed to the outside of the organic insulating film.

13. The electro-optical device according to claim 11,
wherein, if the thickness of the metal film is a and the thickness of the inorganic insulating film is b, then a/b>5.

14. The electro-optical device according to claim 11,
wherein the thickness a of the metal film satisfies a>100 nm, and the thickness b of the inorganic insulating film satisfies b<20 nm.

15. The electro-optical device according to claim 11,
wherein the wiring pattern has two or more portions in which the metal film and the conductive film are electrically connected to each other through the side of the metal film exposed from the inorganic insulating film.

16. The electro-optical device according to claim 11,
wherein the portion of the metal film electrically connected to the conductive film through the side of the metal film has a comb shape.

17. The electro-optical device according to claim 11,
wherein the wiring pattern includes a conductive base adhering layer formed under the metal film, and
wherein the portion of the metal film electrically connected to the conductive film through the side of the metal film is formed in an isolated island-shaped pattern.

18. The electro-optical device according to claim 11,
wherein conductive particles for electrically connecting the first inter-substrate conducting terminal to the second inter-substrate conducting terminal are dispersed in the sealing material.

19. The electro-optical device according to claim 11,
wherein the metal material includes at least one of silver alloy, aluminum alloy, and aluminum.

20. The electro-optical device according to claim 11,
wherein the metal material has a two-layer structure of an upper layer formed of aluminum alloy or aluminum and a lower layer formed of a molybdenum film or a molybdenum alloy film.

21. An electro-optical device comprising:
a pair of opposed substrates;
an electro-optical material interposed between the pair of opposed substrates;
a metal film formed of a metal material having a vertical side rising in a substantially vertical direction away from one of the opposed substrates;
an insulating film having a first portion covering the metal film and a second portion disposed adjacent to the vertical side of the metal film, the second portion of the insulating film being thinner than the metal film so that the vertical side of the metal film is exposed through the insulating film; and
a wiring line disposed on the insulating film and electrically connected to the vertical side of the metal film that is exposed through the insulating film.

22. The electro-optical device according to claim 21,
wherein the metal material includes at least one of silver alloy, aluminum alloy, and aluminum.

23. The electro-optical device according to claim 21,
wherein the metal material has a two-layer structure of an upper layer formed of aluminum alloy or aluminum and a lower layer formed of a molybdenum film or a molybdenum alloy film.

24. An electrical wiring structure, comprising:
a substrate; and
a wiring pattern including a first region and a second region, the first region of the wiring pattern including a structure in which an insulating film is formed on the substrate and a conductive film formed of a transparent conductive film is formed on the insulating film, and the second region including a structure in which a metal film formed of a metal material is formed on the substrate, the insulating film is formed on the metal film, and the conductive film is formed on the insulating film,
wherein the metal film has a vertical side rising in a substantially vertical direction away from the substrate at a boundary between the first region and the second region,
the insulating film in the first region is formed to have a thickness that is less than a thickness of the metal film in the second region; and the vertical side of the metal film is exposed from the insulating film formed in the first region and the second region such that the conductive film extends from the first region and contacts the vertical side at the boundary between the first region and the second region, and the metal film formed in the second region is electrically connected through the conductive film making contact with the vertical side.

* * * * *